United States Patent [19]

Warner et al.

[11] 4,101,894
[45] Jul. 18, 1978

[54] RADIO BEACON FOR A NAUTICAL EMERGENCY RESCUE SYSTEM

[76] Inventors: Melvin B. "Cy" Warner, 12144 Blix St., Los Angeles, Calif. 90068; Dan H. Marshall, II, 873 Pecan Ct., Sunnyvale, Calif. 94087

[21] Appl. No.: 724,348

[22] Filed: Sep. 17, 1976

[51] Int. Cl.² ..................... G01S 5/04; H04B 1/034
[52] U.S. Cl. .......................... 343/112 R; 325/116; 343/112 TC; 343/113 PT; 343/709
[58] Field of Search .................... 325/116, 113; 343/112 R, 112 TC, 848, 709, 828, 829, 898

[56] References Cited

U.S. PATENT DOCUMENTS

| | | | |
|---|---|---|---|
| 3,068,415 | 12/1962 | Johnson | 325/185 |
| 3,714,573 | 1/1973 | Grossman | 343/112 TC |
| 3,747,104 | 7/1973 | Pansini | 343/112 R |
| 3,946,391 | 3/1976 | Cuckler et al. | 343/709 |

OTHER PUBLICATIONS

FM and Television, pp. 22-24, 48, 57, May, 1946.

Primary Examiner—Nelson Moskowitz
Assistant Examiner—Richard E. Berger
Attorney, Agent, or Firm—Spensley, Horn & Lubitz

[57] ABSTRACT

A radio beacon for a nautical emergency rescue system includes a flotation housing containing an antenna in an upper portion, a ground plane and a transmitter in a central portion, and batteries in a lower portion. When placed in the water, the lower section is submerged and the central section is at surface level, enabling contact between the ground plane and the water via conductors that pass through the housing. The upper portion projects above the water to permit efficient radiation from the antenna, which consists of a vertical rod and a coaxial cylindrical can that is open at the bottom end. The upper end of the rod is attached to the center of the can closed end. The radio transmitter is frequency modulated in a distinctive pattern, and operates with a duty cycle that permits detection and direction finding of multiple such beacons.

20 Claims, 8 Drawing Figures

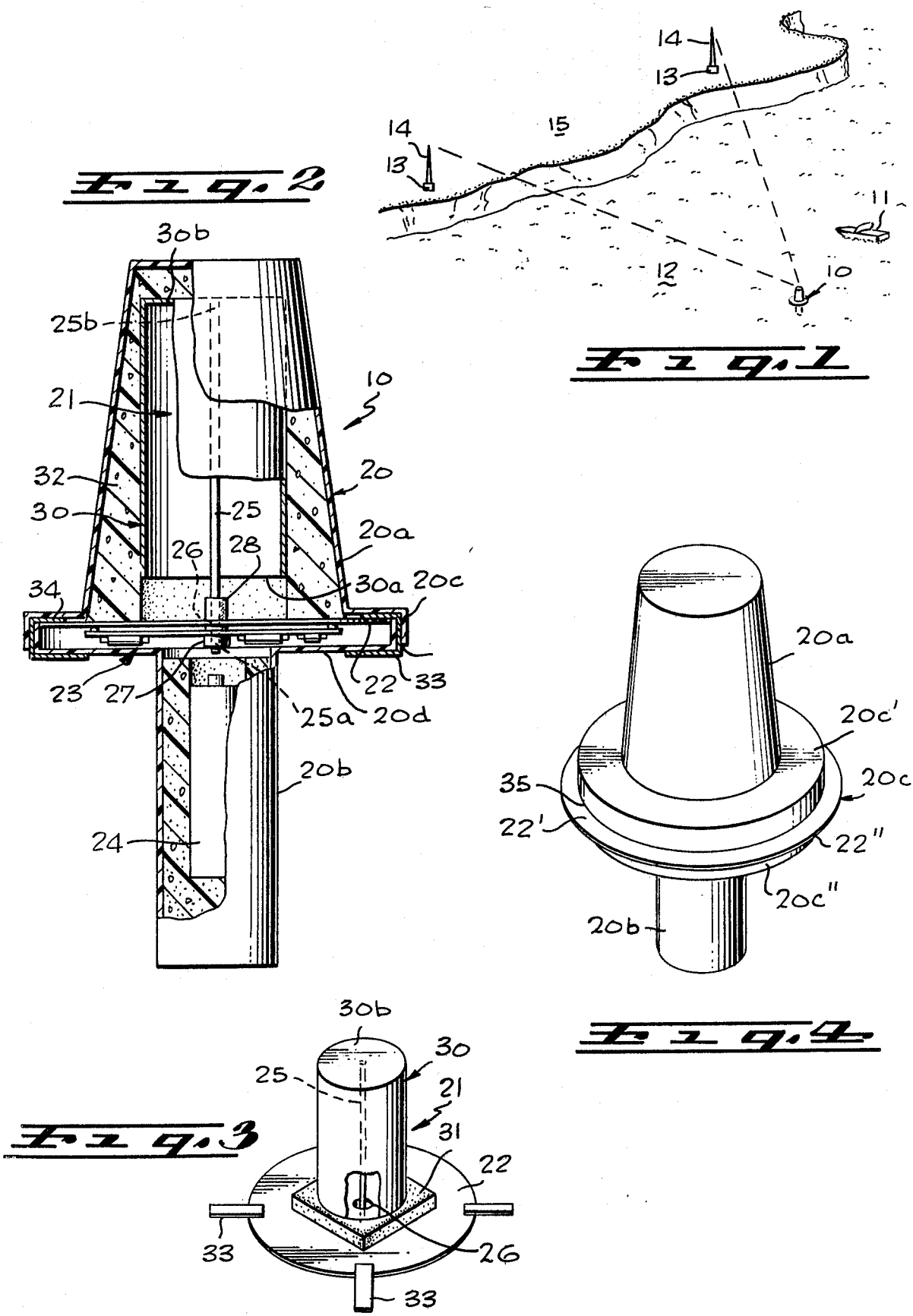

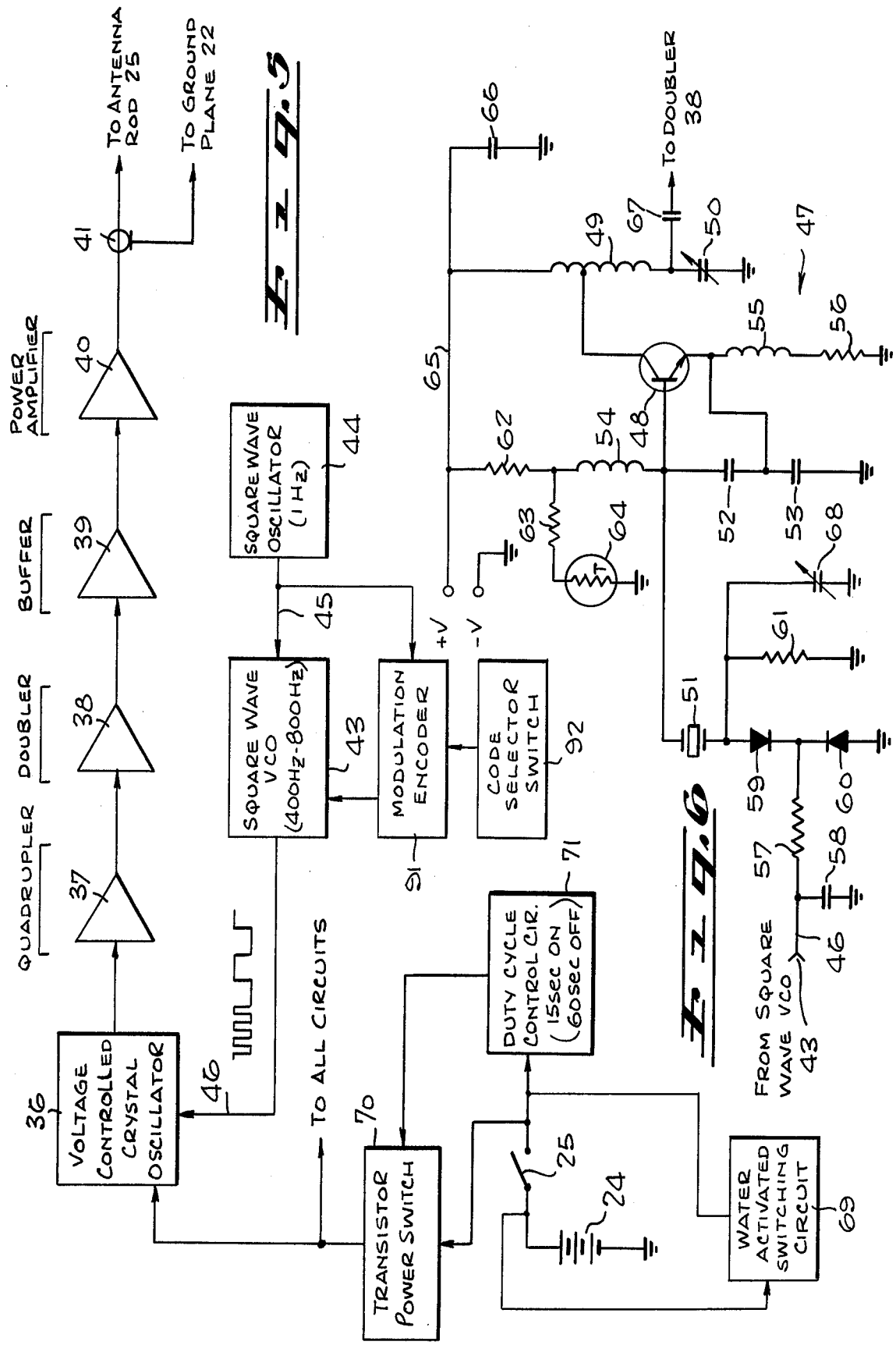

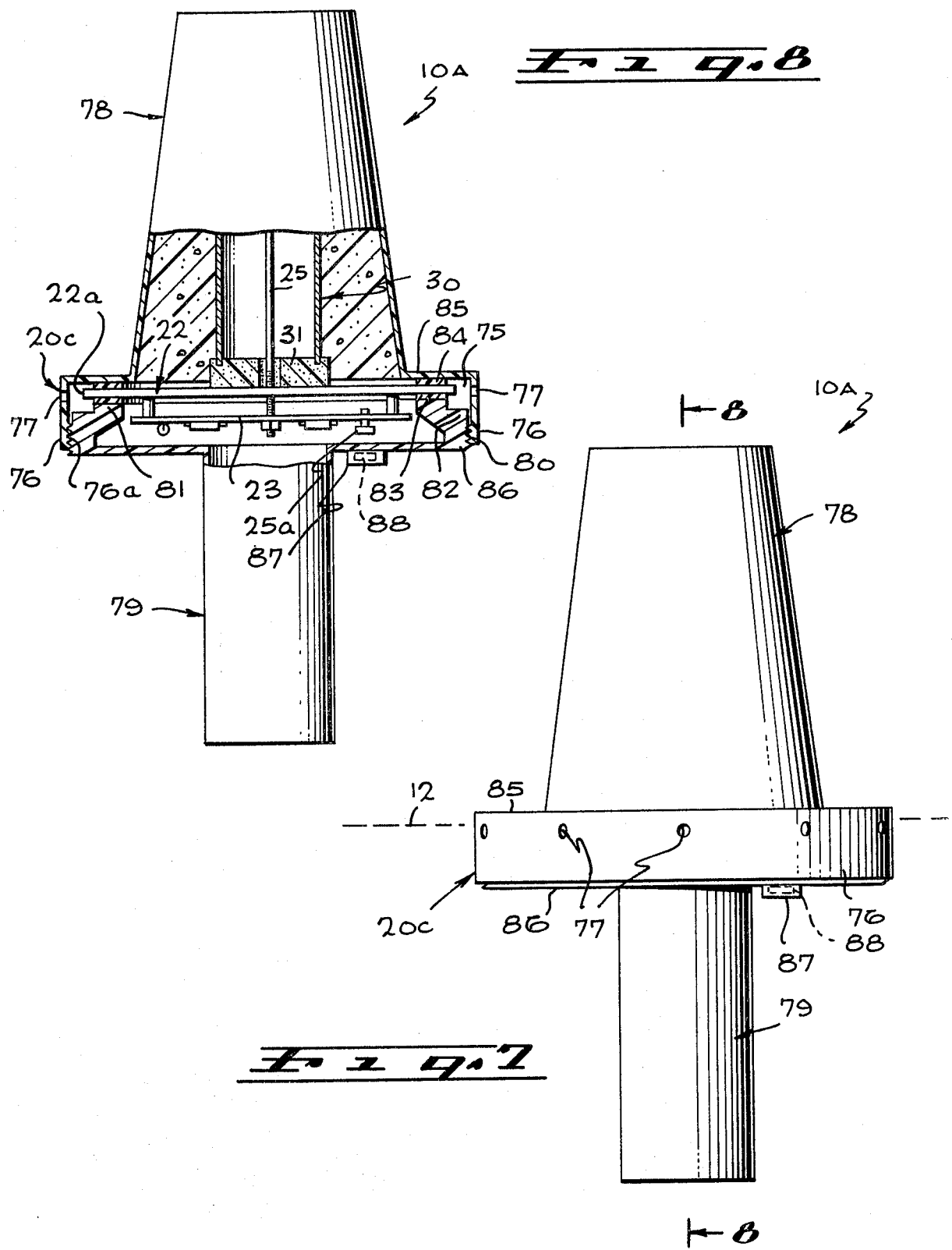

RADIO BEACON FOR A NAUTICAL EMERGENCY RESCUE SYSTEM

BACKGROUND OF THE INVENTION

1. Field of the Invention

The present invention relates to a radio beacon for a nautical emergency rescue system.

2. Description of the Prior Art

Recent years have seen a dramatic increase in the number of pleasure craft using coastal waters. Sailing and power boating have become the hobbies of many. But the pleasure of sailing can rapidly turn to disaster in the event of capsize, of becoming lost in the fog, or of being disabled in a storm, to name only a few dangers of the sea. In these events, help may not always be near. Impaired visibility due to bad weather is more the rule than the exception. Two-way radio provides the means for summoning help, but is relatively expensive and thus not available to the majority of boat owners.

The present invention relates to a system for summoning aid to a vessel in distress. To this end, each sail boat or power boat is provided with a compact radio beacon transmitter contained in a waterproof flotation housing. In the event of capsize or other disaster, the beacon is turned on and thrown in the water. A signal is transmitted automatically from the beacon that is picked up by receiving stations on the shore. These stations typically would use antennas situated on high ground so as to provide maximum range coverage of coastal waters. The beacon frequency would be monitored continuously, so that a vessel in distress, so equipped would be detected almost immediately.

Advantageously, the modulation of the beacon signal would be sufficiently unique to allow prompt automatic verification that it comes from a vessel beacon transmitter. Once verified, a directional fix is obtained from the beacon and the coast guard or other rescue service informed. The beacon then can be used to guide the coast guard ship, helicopter or other vessel that is sent to the rescue. An efficient, inexpensive nautical emergency rescue system thereby is provided to the average pleasure boat owner.

The principal object of the present invention is to provide an inexpensive, efficient radio beacon for use with such a nautical emergency rescue system.

A particular problem associated with radio beacons is that of insuring efficient radiation with a transmitter of low power in a small package. Compact packaging, and the need for providing a signal that can be picked up from receivers situated in different directions precludes the use of a high gain directional antenna. Thus another object of the present invention is to provide a novel antenna configuration for a radio beacon.

SUMMARY OF THE INVENTION

These and other objectives are achieved by providing a radio beacon contained in a compact flotation housing. The housing includes an upper portion containing the novel antenna, a central portion containing the antenna ground plane and the transmitter itself, and a lower portion containing batteries to power the transmitter. The weight of the batteries helps insure that when the beacon is placed in the water, the lower portion will be submerged with the upper, antenna-containing portion projecting upwardly above the water surface. The ground plane is in electrical contact with the water surface, an arrangement which optimizes the radiation efficiency of the beacon.

The unique antenna configuration includes a ground plane disc situated within the housing central portion. This disc is in electrical contact with the water via conductive segments that extend through sealed openings at the housing periphery.

The antenna itself consists of a metal rod that projects upwardly from the center of the ground plane (from which it is electrically insulated) along the central axis of the housing upper portion. Surrounding most of the rod is a metal cylinder that is open at its lower end and closed at its upper end. The rod is attached to the cylinder closed end to provide both support and electrical connection thereto. Polyurethane foam or other material within the housing upper portion maintains the cylindrical can exactly coaxial with the rod and spaces the can the required distance above the ground plane. This combined rod-can-ground plane arrangement functions as an efficient radiator for signals from the beacon transmitter.

BRIEF DESCRIPTION OF THE DRAWINGS

A detailed description of the invention will be made with reference to the accompanying drawings wherein like numerals designate corresponding elements in the several figures.

FIG. 1 is a pictorial view showing a nautical emergency rescue system using the inventive radio beacon.

FIG. 2 is a side view, partly broken away and in section, showing the inventive radio beacon.

FIG. 3 is a simplified pictorial view of the beacon antenna.

FIG. 4 is a perspective view of an alternative form of the radio beacon.

FIG. 5 is an electrical block diagram of a radio transmitter useful in the beacon of FIG. 2.

FIG. 6 is an electrical schematic diagram of the voltage controlled oscillator portion of the transmitter of FIG. 5.

FIG. 7 is a perspective view of another alternative embodiment of the radio beacon.

FIG. 8 is a sectional view of the radio beacon of FIG. 7 as viewed along the line 8—8 thereof.

DESCRIPTION OF THE PREFERRED EMBODIMENTS

The following detailed description of the best presently contemplated modes of carrying out the invention. This description is not to be taken in a limiting sense, but is made merely for the purpose of illustrating the general principles of the invention since the scope of the invention best is defined by the appended claims.

Operation characteristics attributed to forms of the invention first described also shall be attributed to forms later described, unless such characteristics obviously are inapplicable or unless specific exception is made.

As shown in FIG. 1, the inventive radio beacon 10 is intended for use as part of a nautical emergency rescue system. The inventive beacon is carried on a boat 11, typically a pleasure craft such as a sail boat or small power boat. In the event of capsize or other emergency, the beacon 10 is placed in the water 12 and energized. The signal transmitted by the beacon 10 is detected by receivers 13 having antennas 14 situated on the shore 15. A directional fix is obtained that locates the craft 11 in distress. This information may be provided to the coast guard or others to carry out the necessary rescue operation.

FIG. 2 shows a preferred embodiment of the invention radio beacon 10. The beacon is enclosed in a waterproof flotation case or housing 20 made of an electrically insulative material such as plastic. The housing 20 includes an upper portion 20a typically having an inverted, truncated conical shape, a lower section 20b of generally cylindrical configuration, and an intermediate central portion 20c that is generally disc-shaped. The lower portion 20b is weighted so that when the beacon 10 is placed in the water 12, the lower portion 20b will be submerged, the upper portion will be upright out of the water, and the central section will rest generally in contact with the water surface.

Contained within the housing 20 are an antenna 21 including a ground plane member 22, a radio transmitter 23 connected to the antenna 21 and one or more batteries 24 used to power the transmitter 23. Advantageously the batteries are mounted within the housing lower portion 20b and serve as the weights which insure submergence of that housing portion.

Details of the antenna 21 are shown in FIG. 3. It includes a metal rod 25 that extends upwardly along the central axis of the housing upper portion 20a. The rod 25 is perpendicular to the ground plane 22 but is not electrically connected to that ground plane. Rather, the lower end 25a of the rod 25 extends through a clearance hole 26 in the center of the ground plane 22 and is threaded into a support bracket 27. A cylindrical insulative sleeve 28 may be provided around the rod 25 in the clearance hole 26.

Surrounding the rod 25 is a cylindrical metal can 30 having an open lower end 30a and a closed upper end 30b. The upper end 25b of the rod 25 is rigidly attached to the center of the can upper end 30b. The length of the can 30 is less than the height of the rod 25, so that the lower can end 30a is spaced above the ground plane 22. An appropriate insulative cushion 31 (FIG. 3) may be mounted on the ground plane 22 to maintain the can in coaxial alignment with the rod 25 and to space the can the required distance above the ground plane. Alternatively, the entire interior of the housing upper portion 20a may be filled with polyurethane or other foam plastic material 32 as shown in FIG. 2 to maintain the can 30 in its coaxial orientation. This coaxial alignment results in maximum radiation efficiency and insures an omnidirectional radiation pattern.

The ground plane 22 itself consists of a planar metal disc that is mounted within the housing central portion 20c. It has been found that optimum radiation from the beacon 10 is obtained when the ground plane 22 is in electrical contact with the surrounding water 12. Electrical contact from ground plane to water is necessary to provide a stable and predictable characteristic impedance at the antenna feed point. To this end, there are provided electrically conductive strips 33 that are connected to the ground plane 22. These strips 33 pass through sealed openings 34 in the housing central section 20c and extend for a short distance along the periphery and lower surface 20d of the housing central portion 20c. In this manner when the beacon 10 is placed in the water, electrical contact is made between the ground plane and the water via the exposed sections of the conductive strips 33.

In the alternative embodiment of FIG. 4 the housing central portion 20c is made in two sections, an upper section 20c' and a lower section 20c". The ground plane 22' itself has a diameter greater than that of the housing center section 20c, and so projects outwardly therefrom. The projecting annular peripheral ground plane section 22" thus will come into direct contact with the water 12 when the beacon 10 is in use. An appropriate seal 35 is provided between the ground plane 22 and the housing sections 20c', 20c" so as to maintain the waterproof integrity of the flotation housing 20.

Advantageously the transmitter 23 (FIG. 2) also is mounted within the housing central portion 20c, just below the ground plane 22. In this way, a minimum length transmission path is provided from the transmitter output stage to the lower end 25a of the rod 25, the point at which the antenna 21 is driven. An illustrative radio transmitter 23 that is advantageously used with the inventive beacon 10 is shown in FIGS. 5 and 6. This transmitter is designed for operation at approximately 156 MHz, but of course the invention is not limited either to this frequency or to the specific form of transmitter shown.

Referring to FIG. 5, the transmitter 23 includes a voltage controlled crystal oscillator 36 that operates at approximately 19.5 MHz. A multiplier circuit 37 quadruples this frequency to approximately 78 MHz, and a doubler 38 provides a signal at the desired 156 MHz frequency. This signal is fed to a buffer amplifier 39 and a power amplifier 40 that provides an output via a short coaxial line 41 to the end 25a of the rod 25 in the antenna 21. The shield of the coaxial output line 41 is connected to the ground plane 22. The desired output power will depend on the required range of the beacon 20, the sensitivity of the receivers 13 (FIG. 1) and the height of the antenna 14. However, for pleasure craft operation within about twenty-five miles of the shore, a power output of about 1 watt is believed to be sufficient.

Advantageously the transmitter 23 produces a beacon signal which has a distinctive audio quality when demodulated. In that way an operator listening to the receiver 13 will rapidly be alerted to the presence of an emergency signal. The modulation also should be of controlled frequency deviation and repetition rate, so that it can be automatically detected at the receiver 13 and verified as coming from a true radio beacon 10. The modulation may also contain a coded format so that an identifying number or data group unique to each beacon may be transmitted. To this end, the transmitter 23 includes a square wave oscillator 43 which alternately puts out a first square wave at one frequency, typically 400 Hz, and a second square wave at a second frequency, typically 800 Hz. A low frequency (typically 1 Hz) square wave oscillator 44 controls which signal is produced by the oscillator 43. Thus when the low frequency oscillator 44 output on the line 45 is low, the oscillator 43 provides a 400 Hz signal on a line 46 to the transmitter voltage controlled oscillator 36. When the output from the oscillator 44 is high, the square wave oscillator 43 provides an 800 Hz signal on the line 46. If the square wave oscillator 44 operates at 1 Hz, then the signal on the line 46 will consist of a 400 Hz square wave for a period of ½ second, alternating with an 800 Hz signal that also is of ½ sec duration.

Advantageously the signal on the line 46 frequency modulates the output from the oscillator 36. For example, a high signal on the line 46 may cause a 750 Hz deviation of the fundamental crystal frequency of the oscillator 36, resulting in a 6 kHz frequency deviation at the power amplifier 40 output frequency of about 156 MHz. Of course, the invention is not limited to the illustrative modulation rates and frequencies set forth herein.

FIG. 6 shows an electrical schematic diagram of a circuit 47 that functions both as the voltage controlled crystal oscillator 36 and the quadrupler 37. The circuit uses a single transistor 48 having a multiplier output resonant circuit including a tapped inductor 49 and a capacitor 50 that is tuned to four times the frequency established by a crystal 51 connected to the transistor 48 base. The tap on the inductor 49 is made toward the positive supply buss 65 (the low impedance end) in order to increase the Q of the multiplier tuned circuit. The improved selectivity provides a significant reduction of unwanted harmonic currents in the quadrupler 37 output. The emitter to base feedback required to sustain oscillation in the transistor 48 is provided by the capacitive transformer formed by a pair of capacitors 52 and 53. Excessive loading of the capacitors 52 and 53 by the emitter resistor 56 is prevented by a choke 55.

The fundamental resonant frequency of the crystal is dependent upon the load capacitance in parallel with it. The effective load capacitance is the equivalent capacitance provided by a pair of tuning diodes 59, 60, a frequency adjustment capacitor 68 and the feedback capacitors 52, 53.

The oscillation frequency, though established by the crystal 51, is modulated by the voltage control signal from the line 46. This signal is supplied via a resistor 57 and a bypass capacitor 58 to the junction of the tuning diodes 59, 60 connected in series with the crystal 51. A resistor 61 shunts this diode network to provide a DC bias return path for the diode 59. With this arrangement, when the voltage on the line 46 is zero, the oscillator operates at the nominal frequency of the crystal 51. When a non-zero voltage is present on the line 46, the frequency is shifted by an amount depending on that voltage. Since the signal provided by the VCO 43 is a square wave, the output frequency will alternate between the nominal crystal frequency and the offset frequency, with a repetition rate established by the frequency of the square wave presently being supplied on the line 46.

Temperature compensation in the oscillator 36 (FIG. 6) is provided by connecting the base of transistor 48 through a choke 54 to the junction of a voltage divider network consisting of the resistors 62, 63 and a thermistor 64 connected in series between the positive voltage buss 65 and ground. This temperature compensation circuit increases the bias current of the transistor 48 to increase the oscillator power output at low temperatures to compensate for power gain reduction in the stages 38, 39 and 40. This temperature compensation circuit insures that the output power of the beacon 10 will remain at an effective level over a wide ambient temperature range. A bypass capacitor 66 is connected from the positive voltage buss 65 to ground. Output to the doubler 38 is via a capacitor 67.

Power to the transmitter 23 (FIG. 5) is supplied from the batteries 24 via a switch 25 that may be mounted on the housing 20 as shown in FIG. 2. As an alternative to this manual turn-on arrangement, the switch 25 may be replaced or supplemented by a switching circuit 69 (FIG. 5) that is actuated when the beacon 10 is placed in the water. In that way, the beacon signal will start automatically after the manual switch is actuated and/or the beacon 10 is thrown into the water from the endangered craft.

In the event of a coastal storm, it is likely that more than one craft will be capsized or disabled at the same time. Thus several emergency beacons 10 may be transmitting at the same time. To insure that an accurate directional fix can be made to each of the beacons, it is advantageous to operate the beacons with an interrupted duty cycle. To this end, power to the transmitter 23 circuits (FIG. 5) is controlled by a transistor power switch 70 connected to a duty cycle control circuit 71. Typically, these circuits cooperate to turn on the transmitter 23 for a duration of 15 seconds, followed by an off-duration of 60 seconds. This 15 sec. on, 60 sec off duty cycle then is repeated continuously. It is believed that a 15 second duration for the transmitted signal is sufficient to permit a direction finding fix to be taken, even from a helicopter that is searching for the downed craft 11. The 60 second off duration is sufficient to permit such directional fixes to be obtained from other like beacons 10. Random turn-on times of these other beacons should insure that their 15 second on-time falls within the off time of this beacon 10.

In a typical embodiment operating at about 156 MHz, the rod 25 may have a height of about 7 inches and the can 30 may have a length of about 6 inches and a diameter of about 3 inches. These dimensions may be adjusted to optimize the radiation efficiency at the specific transmitter 23 frequency. The ground plane may have a diameter of about 9 inches.

In the alternative radio beacon 10A embodiment of FIGS. 7 and 8, electrical contact between the ground plane 22 and the water is facilitated by an annular fluid chamber 75 within the central section 20C. The outer wall 76 of this central section 20C contains a plurality of holes 77 through which water flows into the channel 75. The peripheral edge 22a of the ground plane 22 projects into the channel 75. Thus when the beacon 10A is in use, the channel 75 and the holes 77 become substantially filled with water, thereby providing the requisite electrical contact between the ground plane 22 and the body of water 12 in which the beacon 10A is floating.

As shown in FIG. 8, the housing for the beacon 10A is formed of two unitary members 78 and 79 generally configured like the embodiment of FIG. 2. However, the annular depending sidewall 76 of the upper member 78 is provided with the holes 77 and with an internal thread 76a. This receives the exterially threaded, upwardly projecting annular side wall portion 80 of the lower housing member 79.

To define the channel 75, the sidewall 80 includes an upper annular region 81 having a smaller diameter than the sidewall 80 and connected thereto by a shoulder 82. An annular gasket 83 seals the top of the upper annulus 81 to the bottom of the ground plane 22. Another gasket 84 seals the ground plane 22 to the undersurface of the radially outwardly extending annular flange region 85 of the upper housing member 78. In this manner, the channel 75 is defined by the flange 85, the depending wall 76 containing the holes 77, the shoulder 82 and the upper annular region 81 of the housing member 79, and the gaskets 83 and 84. The diameter of the gaskets 83 and 84 is of course slightly less than the diameter of the ground plane 22, so that the annular periphery 22a of that ground plane projects into the channel 75.

Another feature of the radio beacon 10A is the use of a magnetic switch 25a to implement the switch 25 in the circuit of FIG. 5. This magnetic switch 25a is mounted to the circuit board 23 within the interior of the central section 20c. The switch 25a is in close proximity to the horizontal annular section 86 of the lower housing member 79. A sliding knob 87 is mounted on the exterior of that annular section 86 in proximity to the magnetic switch 25a. The knob 87 contains a magnet 88. Thus when the knob 87 is moved from one position to another, the magnet 88 functions to turn on the magnetic switch 25a, thereby energizing the beacon transmitter. A leak proof switch mechanism thus is accomplished.

Another optional feature of the invention is shown in FIG. 5. This concerns changing the modulation pattern of the beacon transmitter to indicate the nature of the emergency. To this end, the oscillator 44 output is supplied to a modulation encoder 91 which alters the modulation pattern introduced by the square wave voltage controlled oscillator 43. Several different encoding patterns may be chosen using a code selector switch 92.

The benefit of such a selectable coding system would be to permit determination of the seriousness of an emergency in the case when several distress signals are detected at the same time from different radio beacons. Thus a first modulation pattern may indicate a minor problem, such as the vessel being out of fuel. Another encoding pattern may indicate a capsize or other problem of more serious nature, while a third code may designate a severe emergency in which loss of life is threatened.

Intending to claim all novel, useful and unobvious features shown or described, the applicant claims:

1. In a radio beacon intended for use with a nautical emergency rescue system, the improvement comprising;
    a waterproof, electrically insulative flotation housing having an upper portion, a lower portion and a central portion, said lower portion being weighted so that when said housing is placed in the water, said lower portion will be submerged, said upper portion will be upright out of the water and said central portion will be at about water surface level,
    a ground plane mounted within said central portion,
    an antenna within said housing upper portion including;
    a conductive rod extending generally perpendicularly upwardly from said ground plane but electrically insulated therefrom, and
    a conductive cylindrical can extending downwardly, coaxially over said rod, the lower end of said can being open, the upper end of said can being closed and attached at its center to the upper end of said rod, said can being shorter than said rod, and
    a radio transmitter mounted with said housing and electrically connected to said antenna and to said ground plane.

2. A radio beacon according to claim 1 further comprising;
    electrical conduction means extending through said housing for providing electrical connection between said ground plane and said water.

3. A radio beacon according to claim 1 wherein said radio transmitter is frequency modulated, and including a modulator for alternately shifting the transmitter frequency between two values at a controllable repetition rate.

4. A radio beacon according to claim 3 wherein said modulator alternately shifts the transmitted frequency at first and second repetition rates, and including modulator control circuitry, cooperating with said modulator, to establish the time duration at which said modulator alternates between said first and second repetition rates.

5. A radio beacon according to claim 1 together with a direction finding receiver system for receiving the signal transmitted from said transmitter and for finding the direction of said beacon with respect to the receiver system.

6. A radio beacon according to claim 5 further comprising;
    duty cycle control circuitry for establishing a duty cycle during which said radio transmitter is on, the off time of said duty cycle being sufficiently long to permit reception and direction finding of the transmitted signals from at least one other like beacon during said off time.

7. A radio beacon according to claim 1 wherein said radio transmitter is frequency modulated by a modulator to provide a beacon identification code, said receiver system including means for verifying individual beacon identification codes.

8. A radio beacon according to claim 1 wherein said transmitter is powered by battery, said battery being mounted in said housing lower portion to provide the weight therefor.

9. A radio beacon according to claim 1 further including insulative material, within said housing upper portion, for maintaining a stable, coaxial relationship between said rod and said can.

10. A radio beacon according to claim 9 wherein said insulative material is a plastic foam filling the entire area within said housing upper portion.

11. A radio beacon according to claim 1 wherein said housing upper portion is of inverted truncated conical shape, wherein said central portion is generally disc-shaped with a diameter greater than the maximum diameter of said upper portion, and wherein said lower portion is generally cylindrical.

12. A radio beacon according to claim 2 wherein said electrical conduction means comprises metal contacts extending through openings in said housing central section and exposed for contact with said water, said openings being sealed to prevent water entry therethrough.

13. A radio beacon according to claim 2 wherein said ground plane is a planar metal disc having a diameter greater than said housing central portion and extending therethrough, said electrical conduction means comprising the annular peripheral section of said disc that extends beyond said housing.

14. A radio beacon according to claim 2 further comprising a channel region within said housing central portion in fluid communication with said water, a portion of said ground plane extending into said channel region to establish electrical contact between said ground plane and said water when said beacon is in use.

15. A radio beacon according to claim 1 together with a modulator for providing a coded modulation of the transmitted beacon signal, and switch means connected to said modulator for selecting different modulation codes.

16. A radio beacon according to claim 1 together with;
    a magnetic switch mounted within said waterproof housing and connected to turn on power to said transmitter, and
    moveable means, including a magnet, mounted on the outside of said housing opposite said switch and including a magnet to actuate said switch when said means is moved.

17. A nautical emergency rescue system comprising;
a plurality of beacons each having an antenna, a ground plane, a transmitter connected to said antenna and ground plane, and a modulator for said transmitter all contained in a flotation case,
said modulator providing frequency modulation of said transmitter with a repetitive, selectable pattern including a component at audio frequency, the pattern of each beacon being uniquely different from the pattern of the other beacons,
a duty cycle control circuit for said beacon, contained within said case, for alternately turning on said transmitter for a time duration sufficient to permit detection and direction finding of said beacon and for turning off said transmitter for a time duration sufficient to permit detection and direction find of other like beacons operating on the same frequency, and
a direction-finding receiver system for detecting and finding the direction of plural such beacons, the unique modulation pattern facilitating identification of each detected beacon.

18. A system according to claim 17 wherein said flotation case includes an upper section containing said antenna, a central section containing said ground plane, and a lower section containing batteries to power said transmitter, said batteries weighting said lower section so that when placed in a body of water said lower section will be submerged and said upper, antenna-containing section will be above the water surface, and wherein each beacon further includes an emergency indicating code selector switch and associated circuitry for modifying the modulation pattern so as to provide both identification of said beacon and a code indicating the nature of the emergency causing use of the beacon.

19. A system according to claim 18 wherein said beacon also includes means for providing electrical conduction between said ground plane and said water, and wherein the duty cycle includes an on-time on the order of about 15 seconds followed by an off-time on the order of about 60 seconds.

20. A nautical emergency rescue system comprising:
a beacon having an antenna, a ground plane, a transmitter connected to said antenna and ground plane, and a modulator for said transmitter all contained in a flotation case,
said modulator providing frequency modulation of said transmitter with a repetitive, selectable pattern including a component at audio frequency,
a duty cycle control circuit for said beacon, contained within said case, for alternately turning on said transmitter for a time duration sufficient to permit detection and direction finding of said beacon and for turning off said transmitter for a time duration sufficient to permit detection and direction find of other like beacons operating on the same frequency,
a direction-finding receiver system for detecting and finding the direction of plural such beacons, and wherein
said ground plane is a metal disc, and said antenna includes a rod extending perpendicularly to said ground plane and an inverted can having one open end mounted coaxially with said rod, said rod being attached to the center of the can closed end, said can being shorter than said rod, and insulative means for maintaining said can concentric with said rod and in spaced relationship above said ground plane.

* * * * *